US008788852B2

(12) United States Patent
Chun et al.

(10) Patent No.: US 8,788,852 B2
(45) Date of Patent: Jul. 22, 2014

(54) SYSTEM AND METHOD FOR PROVIDING POWER THROUGH A REVERSE LOCAL DATA TRANSFER CONNECTION

(75) Inventors: Ee Wen Chun, Selangor (MY); Choon Gun Por, Penang (MY)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 13/175,051

(22) Filed: Jul. 1, 2011

(65) Prior Publication Data

US 2013/0007336 A1  Jan. 3, 2013

(51) Int. Cl.
*H02J 7/00* (2006.01)

(52) U.S. Cl.
USPC ........... 713/300; 713/340; 320/126; 320/127; 320/128; 320/137

(58) Field of Classification Search
USPC ........... 713/300, 340; 320/126, 127, 128, 137
See application file for complete search history.

(56) References Cited

U.S. PATENT DOCUMENTS

| | | | |
|---|---|---|---|
| 7,447,922 B1 | 11/2008 | Asbury et al. | |
| 8,084,987 B2 * | 12/2011 | Hurtz | 320/103 |
| 2003/0030412 A1 * | 2/2003 | Matsuda et al. | 320/127 |
| 2005/0174710 A1 * | 8/2005 | Masui et al. | 361/92 |
| 2006/0214630 A1 * | 9/2006 | Huang | 320/112 |
| 2008/0265838 A1 * | 10/2008 | Garg et al. | 320/115 |
| 2009/0167245 A1 * | 7/2009 | Nguyen | 320/128 |
| 2010/0064153 A1 * | 3/2010 | Gk et al. | 713/310 |
| 2010/0223480 A1 | 9/2010 | Fratti et al. | |
| 2011/0127950 A1 * | 6/2011 | Veselic | 320/107 |
| 2011/0140674 A1 | 6/2011 | Veselic et al. | |
| 2011/0316472 A1 * | 12/2011 | Han et al. | 320/103 |
| 2012/0249071 A1 * | 10/2012 | Yang | 320/110 |

FOREIGN PATENT DOCUMENTS

KR  10-1997-0049293  7/1997

OTHER PUBLICATIONS

International Search Report and Written Opinion dated Dec. 20, 2012 for Application PCT/US2012/045226.

* cited by examiner

*Primary Examiner* — Vincent Tran
(74) *Attorney, Agent, or Firm* — KED & Associates

(57) ABSTRACT

A power source device supplies power to a host for charging a finite power source of the host. The power is supplied through an interface connecting the host device. The interface may be a Universal Serial Bus (USB) cable or another type of local connection cable.

29 Claims, 8 Drawing Sheets

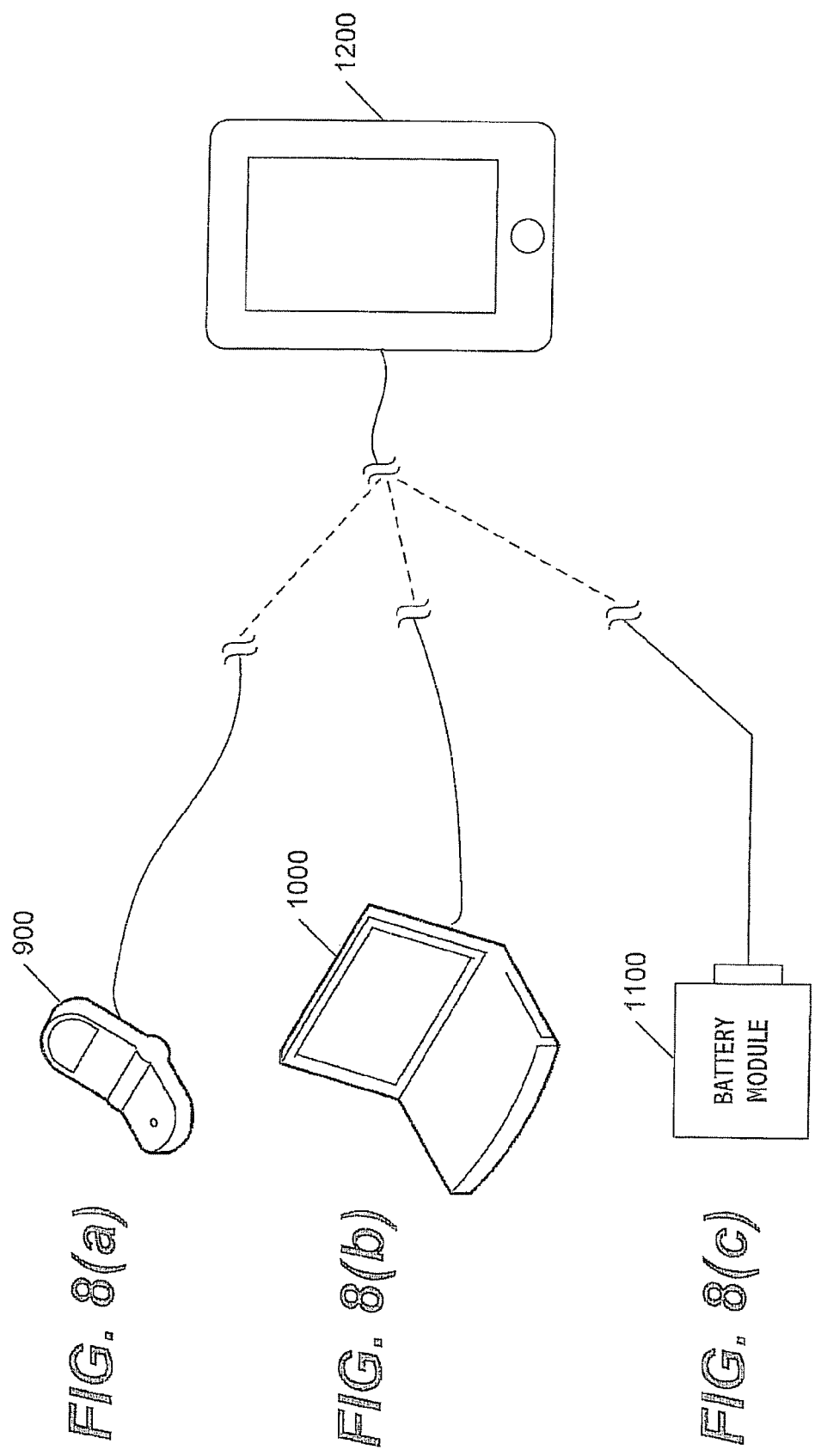

SYSTEM AND METHOD FOR PROVIDING POWER THROUGH A REVERSE LOCAL DATA TRANSFER CONNECTION

FIELD

One or more embodiments herein relate to supplying power to an electronic device.

BACKGROUND

The development of universal serial bus (USB) and other types of local connections has simplified and standardized the way data is transferred between a host system and a device. In some cases, these connections also provide a way of supplying power from the host system to the device. However, existing USB and local connection interfaces do not offer a way of allowing the device to supply power to the host system.

BRIEF DESCRIPTION OF THE DRAWINGS

FIGS. 8(a)-8(c) show other illustrative applications of the power providing system, where the applications in FIGS. 8(a) and 8(b) involve the use of different mobile devices and the application in FIG. 8(c) involves the use of a specially dedicated battery module.

DETAILED DESCRIPTION

In accordance with one or more embodiments described below, the "port" and "connector" terminology used herein helps to define the types of devices being connected. For example, in accordance with at least one embodiment, the term "connector" serves to define a device and the term "port" serves to define a host. Thus, for example, when a USB interface is used, the connector serves to define the USB device, as opposed to a USB host. Conversely, the port serves to define the USB host system, as opposed to a USB device. One or more embodiments herein provide for sending current from the device having a USB connector to a host having a USB port for purposes of charging the battery of the USB host system, which has not been performed heretofore.

Figure 1:
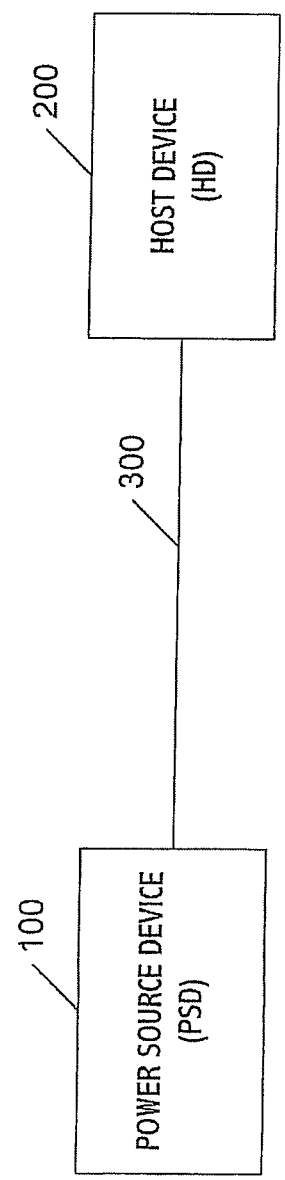
FIG. 1 shows a system for providing power from a source device to a host device.

FIG. 1 shows one embodiment of a system for providing power from a power source device 100 to a host device 200. The power source device may include a finite power source or may be coupled to supply power from an infinite power source such as a car outlet charger or AC power source. The source and host devices are connected by an interface 300 such as a cable.

Examples of a finite power source include a battery, a solar cell or other type of environmental power source, an ultracapacitor, or an electronic device that includes a battery or other type of power source. The electronic device may be a smart phone, personal digital assistant, camera, laptop or notebook computer, computer pad, pod or tablet, electronic book, mobile terminal with computing and/or communication capability, video processor, media player, speaker system, or another type of stationary or mobile electronic device that includes or is coupled to an AC or DC power source, or both. The host device may also be any of these electronic devices. In the discussion to follow, the exemplary case is discussed where both the power source and host devices are notebook computers.

The interface 300 may include a serial or parallel cable that performs unidirectional or bi-directional transfers. Examples of this interface include a Universal Serial Bus (USB) standard cable, a USB On-The-Go standard cable, a FireWire cable, an Ethernet cable, Serial Advanced Technology Attachment (SATA) cable, Musical Instrument Digital Interface (MIDI) cable or another type of local interface cable which transfers data based on a standardized communication protocol.

If a unidirectional cable is used, then the cable transfers power from the power source device to the host device, with our without data. That is, if interface 300 is a unidirectional cable, the cable may be used merely as a power cable to transfer power (current) to the host device. Such an embodiment would be suitable, for example, in the case were the power source device includes or operates merely as an infinite power source. In an alternative embodiment, the cable may transfer power and data either simultaneously or at different times.

If a bi-directional cable is used, then the cable transfers power and data between the power source and host devices. The data may be transferred in both directions or in only one direction (e.g., from the power source device to the host). Either way, power is supplied from the power source device to the host device. In a separate mode of operation, the host device may supply power to the power source device.

Figure 2:
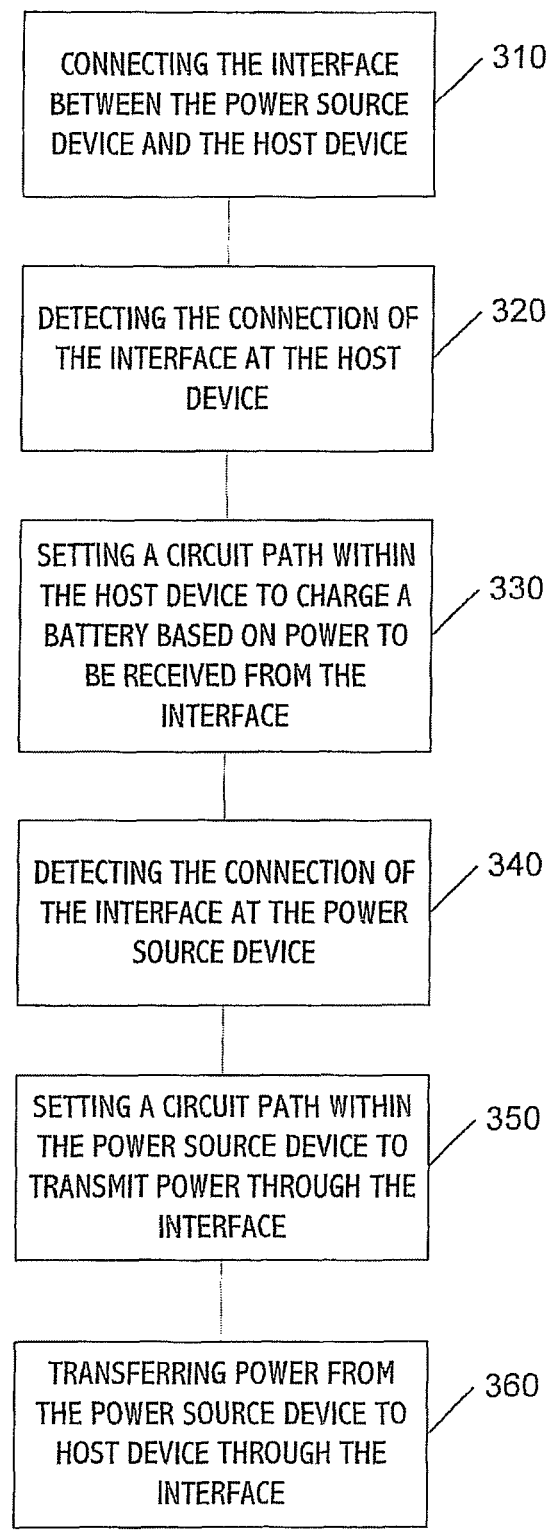
FIG. 2 shows a method for providing power from the source to the host device.

FIG. 2 shows a method for providing power from a power source device to a host device through an interface. This method may be performed using a system such as shown in FIG. 1 or another system. While the operations in FIG. 2 are presented in a predetermined order, in alternative embodiments the sequence of operations may be varied based, for example, on the built-in control circuits and/or software and/or the control protocol executed in the devices.

Initially, the interface is connected between the power source device and host device. (Block 310). This connection may be performed physically, for example, by plugging in connectors on opposing ends of the interface to respective ports in the power source and host devices. If the interface had been previously connected but communications have been disrupted, the connection of the interface may re-established, for example, through a software-driven application executed on the host or power source device, or both.

Once the interface has been connected, the host device detects that the connection has been made. (Block 320). This operation may be performed, for example, in a variety of ways including detection of voltages or signals transmitted on one or more data or control lines of the interface. Depending on the range in which these voltages or signals lie, a determination may be made by controller circuits in the power source and/or host devices as to the presence of an interface connection and also other parameters such as the speed of the data bus corresponding to the interface.

For example, in the case of a USB interface, a controller in the host device may detect a voltage across a pull-up speed identification resistor, indicating that the interface has been connected between the host and power source devices. e.g., when the resistor is connected to the $V_{bus}$ line of the USB interface, a voltage signal is generated indicating that a device has been connected. The host controller may then initialize a USB function. Other methods of detection include detecting power through the power line of the interface or measuring capacitance (or change of capacitance) of a USB port according to, for example, an Attach Detection Protocol (ADP) or another detection protocol.

Once the host device has detected connection of the interface, a controller of the host device sets a circuit path to charge a battery (or other re-chargeable power source) of the host device based on power to be received from the interface. (Block 330). This operation may involve setting one or more switches that control the flow of power from an interface port of the host device to its power source.

This operation may also involve loading corresponding software for execution by the host controller, in order to guide power from a power line of the interface to a charging circuit. In accordance with one embodiment, the charging circuit may normally be configured to receive power from a car or AC adaptor. But, according to the present embodiment, the path to the charging circuit may be reconfigured by the controller to receive power from the interface.

Also, circuit paths normally used to allow the host device to send power to an externally connected device may be reversed or bypassed to allow for receipt of power through the interface for charging the power source of the host device.

In another operation, a controller in the power source device detects connection of the interface. (Block 340). This controller may detect the connection in a manner similar to the controller in the host device.

After detecting this connection, the controller in the power source device sets a circuit path from its power source (or the power source coupled to this device) to a port coupled to the interface. (Block 350). Power is then transmitted through the port to the interface under management of the controller. (Block 360).

Additional operations may include exchanging various control signals between the controllers of the host and power source devices before the power is actually transferred. The generation and exchange of these control signals may be based on communication and/or control protocols compatible with the interface. Also, while operations 340, 350, and 360 are shown after operations 310, 320, and 330, these operations may be performed in a different sequence or these operations may be performed simultaneously based on the governing protocol standard.

Figure 3:
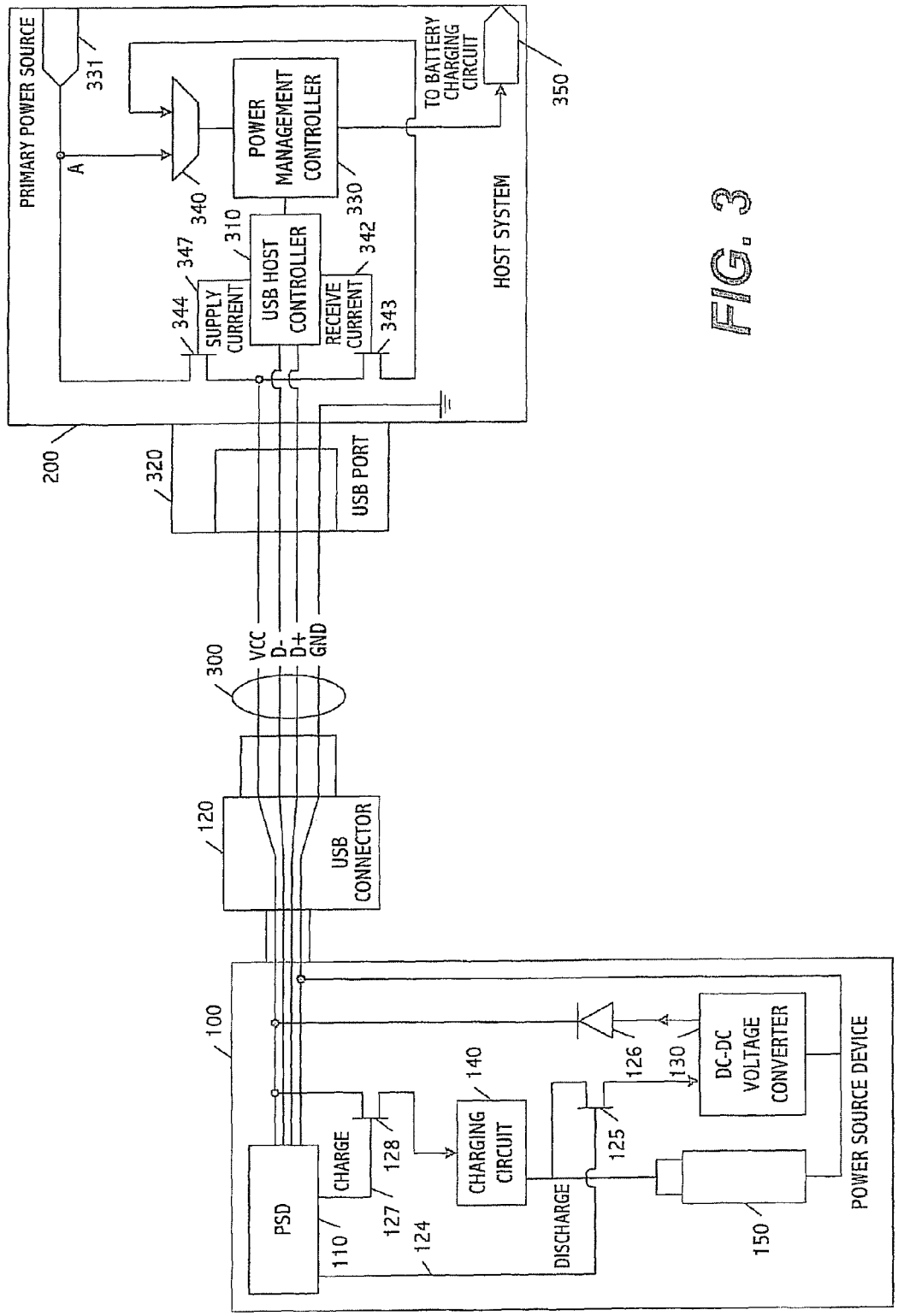
FIG. 3 shows an example of the source and host devices and their connection.

FIG. 3 shows an example of the system of FIG. 1 configured with a USB interface 300 and corresponding controllers in the host and power source devices. The interface may operate and include lines compatible with a standard USB protocol, or may operate and include lines compatible with the so-called On-the-Go (OTG) USB standard.

The power source device 100 includes a PSD controller 110 coupled between a USB connector 120 and a battery 150. The controller has signal lines that match and are coupled to the signal lines in the interface. These signal lines may include a power line (Vcc), a pair of differential data lines (D−) and (D+), and a ground line (GND). Additional lines may be included to perform various other control and/or data transfer operations.

In addition, the power source device may include an optional voltage converter circuit 130 and an optional charging circuit 140. The voltage converter performs a dc-to-dc voltage conversion of voltages transmitted between the battery and power line of the interface.

When battery power is to be transmitted to the interface (to charge the power source of the host device), the controller 110 generates a discharge signal 124 to close a switch 125, in order to establish a circuit path from the battery to the voltage converter circuit 130. The voltage converter circuit then converts the output voltage of the battery to a voltage compatible with the signal line (Vcc), e.g., 5 V, and this voltage passes through a protection diode 126 for transmission on the signal line. (Signal line Vcc actually transmits a current corresponding to voltage Vcc). The GND signal line may be coupled to the battery and voltage converter.

When the battery is to be charged, the controller generates a charge signal 127 to close a switch 128. Closing this switch establishes a circuit path which passes from the external power source through the charging circuit for charging the battery. In the example shown, the circuit path is established to charge the battery based on power received from the signal line Vcc of the interface. During this operation, power flows to the power source device through the USB cable. Conversely, during a charging operation for the host device, power flows from the power source device to the host device in an opposite direction through the interface. Optionally, the controller 110 may close switch 128 to charge the battery based on external power, such as from an external DC or AC power source that is not associated with the USB interface.

The data lines in the USB interface may be used to establish detection of the connection of the interface by the controllers in the host and power source devices, as previously explained. Additionally, during charging of the host device or power source device, the data lines may be used to transfer data between the devices according to a protocol standard that is used to control operation of the interface. The charge and discharge signals may be alternately applied as determined by the controller to control the flow of voltage/current through the power source device. By alternately applying these signals, switches 125 and 128 may be set to different states at times.

The host interface 200 includes a controller 310 coupled between the USB interface and a charging circuit terminal 350, which is coupled to a battery charging circuit and battery (not shown). The controller 310 has signal lines that match and are coupled to at least the data lines in the interface. The signal lines pass from the interface to the controller through a USB port 320, along with the other two signal lines. Based on the data line voltages, the controller is able to detect the USB interface connection.

In addition, the host device may include a power management controller 330 which controls the sending of power from one of two sources. The first source is from a primary power source terminal 331, which, for example, may be coupled to an AC adaptor. The second source corresponds to the power line of the USB interface. The inputs into the power management controller 330 may be selected by a multiplexer 340 or other selector switch. The operation of this multiplexer or selector switch may be controlled, for example, based on a signal from controller 310 or 330.

When the battery of the host device is to be charged based on power from the USB cable, controller 310 generates a receive current signal 342 to close switch 343. At the same time, switch 344 may be opened. Setting these switches in this manner causes current to flow from the power line (Vcc) of the interface to multiplexer 340, which selects this current for input into charging circuit terminal 350 to charge the battery.

When the battery of the host device is to be charged based on power from the primary power source, multiplexer 340 selects to receive the power from the primary power source terminal 331, based, for example, on a control signal from either controller 310 or 330. At this time, both switches 343 and 344 are open. Switch 344 may be closed, based on a supply signal from controller 310, to provide power through the interface for charging the battery of the power source device, as will be discussed in greater detail.

Because switch 343 is opened at this time, no current from the signal line of the USB interface passes into the battery of the host device, in the event the USB interface is still connected.

Figure 4:
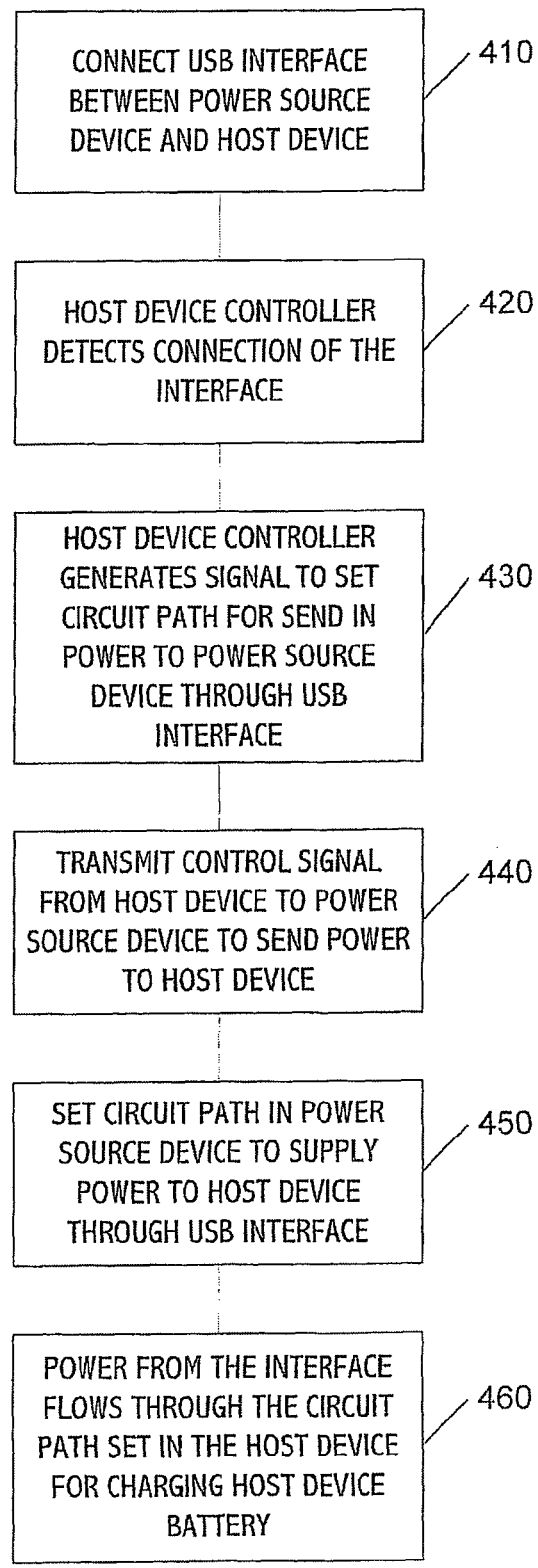
FIG. 4 shows a method for providing power to the host device in FIG. 3.

FIG. 4 shows a method for providing power from a power source device to a host device through a USB interface. This method may be performed by the system shown in FIG. 3 or another system. While the operations in FIG. 4 are presented in a predetermined order, in alternative embodiments the sequence of operations may be varied based, for example, on the built-in control circuits and/or software and/or the control protocol executed in the devices.

Initially, the USB interface is connected between the power source device and host device. (Block 410). This connection may be performed physically, for example, by plugging in connectors on opposing ends of the interface to respective ports in the power source and host devices. If the interface had been previously connected but communications have been disrupted, the connection of the interface may re-established, for example, through a software-driven application executed on the host or power source device, or both.

Once the interface has been connected, the host device detects that the connection has been made. (Block 420). This operation may be performed, for example, in a variety of ways including detection of voltages or signals transmitted on one or more data or control lines of the interface. Depending on the range in which these voltages or signals lie, a determination may be made by controllers in the power source and/or host devices as to the presence of an interface connection and also other parameters such as the speed of the interface.

For example, a controller in the host device may detect a voltage across a pull-up speed identification resistor, indicating that the interface has been connected between the host and power source devices. e.g., when the resistor is connected to the $V_{bus}$ line of the USB interface, a voltage signal is generated indicating that a device has been connected. The host controller may then initialize a USB function. Other methods of detection include detecting power through the power line of the interface or measuring capacitance (or change of capacitance) of a USB port according to, for example, an Attach Detection Protocol (ADP) or another detection protocol.

Once the host device has detected connection of the interface, the host device controller sets a circuit path to charge a battery (or other re-chargeable power source) of the host device based on power to be received from the interface. (Block 430). This operation may involve generating a signal to set one or more switches that control the flow of power from an interface port of the host device to its power source. In the system of FIG. 3, the receive current signal and/or an additional signal may be generated by the controller to cause multiplexer 340 to select power from the interface through switch 343, which has been closed based on the receive current signal.

This operation may also involve loading corresponding software for execution by the host controller, in order to guide power from a power line of the interface to a charging circuit. In accordance with one embodiment, the charging circuit may normally be configured to receive power from a car or AC adaptor or a primary battery. But, according to the present embodiment, the path to the charging circuit may be reconfigured by the controller to receive power from the interface.

Also, circuit paths normally used to allow the host device to send power to an externally connected device may be reversed or bypassed to allow for receipt of power through the interface for charging the power source of the host device.

In another operation, the controller of the host device transmits a control or detection signal to the power source device through the USB interface. This signal instructs a controller in the power source device to initiate a process for providing power to the host device. (Block 440). The control signal may be sent to the power control device through the data lines of the interface, or though another line such as a control line of the interface (not shown).

The control signal may also be used as a basis for allowing the power source device controller to detect connection of the interface. Alternatively, this connection may be detected by the power source device in a manner similar to the detection operation performed by the host device, e.g., by detecting voltages or signals along the data lines of the interface.

After detecting the interface connection and control signal from the host device, the controller in the power source device sets a circuit path from its power source (or the power source coupled to this device) to a port coupled to the interface. (Block 450). In the system of FIG. 3, the circuit path may be set by controller 110 generating the discharge signal 124. The discharge signal closes switch 125 to allow power to be supplied from battery 150 of the power source device to the power line (Vcc) of the interface.

The transmitted power is then received by the host device through port 320 and passed through switch 343, multiplexer 340, and power management controller 33 for input into the charging circuit terminal 350 of the host device battery. (Block 460). The charging circuit then charges the host device battery. A protection circuit may be included in the host device to prevent overcharging.

Additional operations may include exchanging various control signals between the controllers of the host and power source devices before the power is actually transferred. The generation and exchange of these control signals may be based on communication and/or control protocols compatible with the interface. Also, the sequence of operations shown in FIG. 4 may be varied or two or more of these operations may be performed simultaneously based on, for example, the governing protocol standard.

According to one embodiment, the interface may also be used to transfer power from the primary power source or secondary power source (e.g., battery) of the host device to the power source device, for charging the battery (or other finite power source) of the power source device.

In this case, the power management controller 340 generates a signal to the USB host controller 310 to turn off switch 343. This results in shutting off power to the host controller battery, in the event the host controller battery was being charged based on power from the power source device. The multiplexer is also set to an off position, selecting neither input. The controller 310 then generates a supply current signal 347 to close switch 344 in order to open a path for supplying current from the primary or secondary power source of the host device to the power line (Vcc) of the interface. Controller may generate the supply current signal, for example, independently or based on an instruction from the power management controller.

During this process, the power management controller may generate a control signal to be sent to the power source device through the interface. This signal may be sent on one or more of the data lines or on another control line (not shown) in the interface. Once received, the controller of the power source device generates control signals for opening switch 125 and closing switch 128, the latter being closed based on the charge signal from the controller. This charge signal opens a circuit path to the charging circuit 140, and power supplied from the host device through the power line of the interface is used to charge the battery of the power source device.

Figure 5:
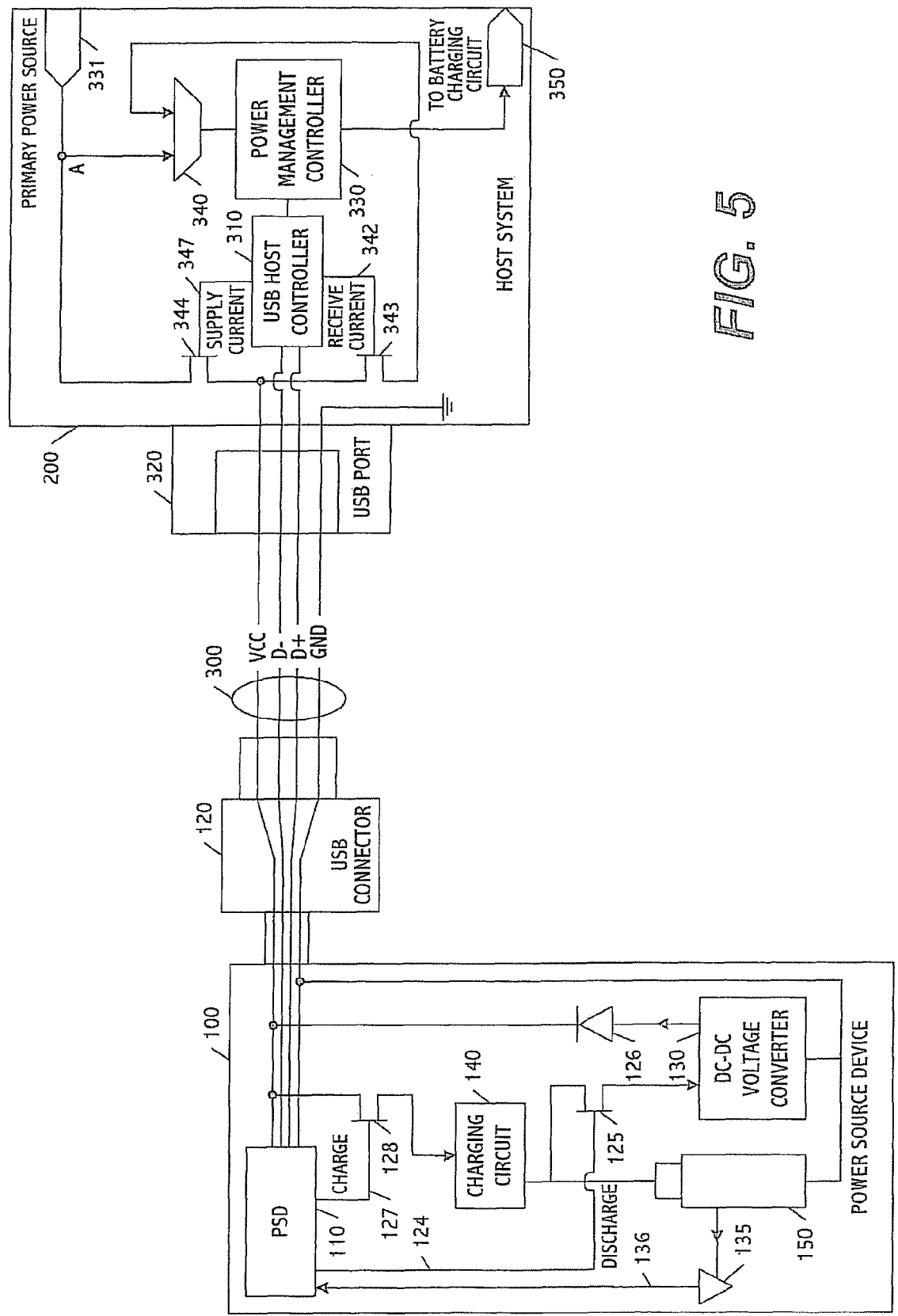
FIG. 5 shows another method for controlling power transfer between the devices.

According to another embodiment, the power source device may include a built-in detection circuit 135 as shown in FIG. 5. The detection circuit generates a signal 136 for input to the PSD controller 110. Based on this signal, the controller will determine whether the remaining battery charge has fallen below a predetermined level. When this happens, the controller may send a signal to the controller of the host device to close switch 344 to allow the primary power source (AC power or car power) to charge battery 150 based on setting the circuit paths as previously described.

This process may take place automatically, and at a time when the host device battery is being charged by power from battery 150. In this case, when the charge in battery 150 falls below the predetermined level as a result of charging the host device battery, the primary power source of the host device may automatically be connected to charge the power source device battery through the interface. Such a scenario may arise, for example, when the host device cannot access power from a primary source when its battery is being charged by the power source device, but then a user of the host device later comes to a location where the primary power source is accessible.

Figure 6:
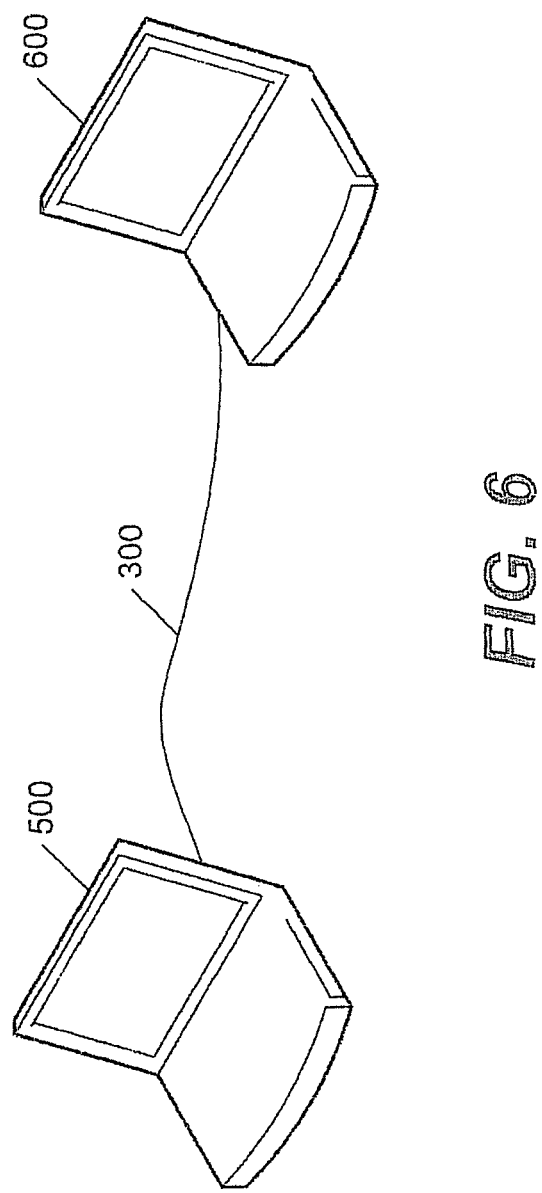
FIG. 6 shows one illustrative application of the power providing system.

FIG. 6 shows a practical application of the aforementioned embodiments applied in the case where the power source device is a notebook computer 500 and the host device 600 is another notebook computer. In this case, the battery of one of the computers is used to supply power to charge the battery of the other computer through interface 300. This application is useful in situations where, for example, AC or car power is not accessible by the user of either computer and one of the computers is low on charge.

Figure 7:
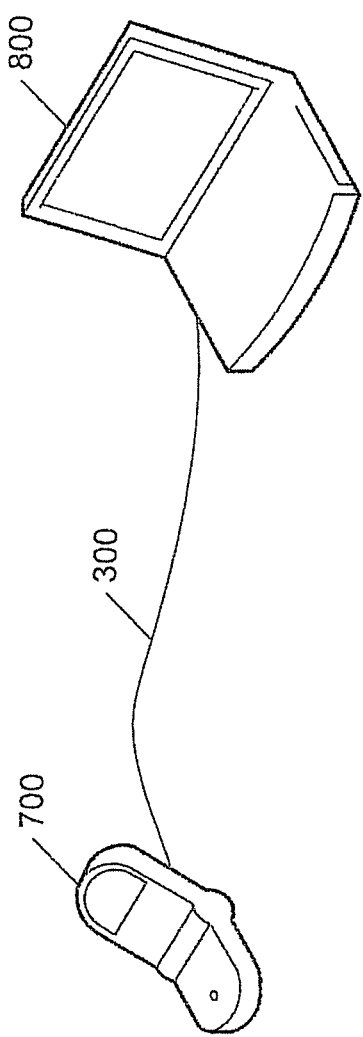
FIG. 7 shows another illustrative application of the power providing system.

FIG. 7 shows another practical application of the aforementioned embodiments applied in the case where the power source device is a cell phone or smart phone 700 and the host device is a notebook computer. In this case, the cell phone battery may be used to charge the notebook computer through a supply of power through interface 300.

FIG. 8 shows other applications applied in the case where the power source device is a cell or smart phone (FIG. 8(*a*)), where the power source device is a notebook computer (FIG. 8(*b*)), wherein the power source device is a special-purpose battery pack 1100, and where the host device is a smart phone, iPod, electronic tablet, or electronic book device.

The special-purpose battery pack 1100 is of particular interest in that such modules may be sold at airports, electronic stores, or other locations where travelers may need to charge their mobile devices and no AC outlet is available. 9. According to one embodiment, the battery pack may exclude circuitry for performing network communications and multimedia functions.

In accordance with another embodiment, different computer-readable media store programs for controlling operations performed by respective ones of the controllers in the power source and host devices. allocation of power in an electronic device. The computer-readable media may be internal memory chips or storage units or may be ones detachably coupled to the power source and host devices through a connector or through another type of communication path.

The program may include code sections to implement any of the operations included in the method embodiments. In accordance with one non-limiting embodiment, the program includes first code to detect connection of an interface between a device and a host and second code to set a first circuit path in the device based on detection of the connection. Power is output from a finite power source to the interface through a connector of the device along the first circuit path. The power passes through the interface to be used to charge a battery of the host. The device may be a USB device and the host may be a USB host.

The second code section may set the first circuit path by generating a first control signal to set the first circuit path. The first control signal may change a state of a switch to allow power to pass from the finite power source to the interface along the first circuit path. Additional code may be included to set a second circuit path to charge the finite power source based on power received from the interface. The code sections may be executed by a controller in the device.

In accordance with another embodiment, a program includes first code to detect connection of an interface between a host and a device and second code to set a first circuit path in the host based on detection of the connection. Power is transferred from the interface to a battery along the first circuit path, and the power may be supplied from a finite power source of the device The port may be a Universal Serial Bus (USB) port and the connector may be a USB connector.

In addition to or in lieu of these programs, each device may store control and protocol software to manage and process the exchange of signals between the host and device, and the power to be transferred between them through the interface.

Also, the aforementioned embodiments may have a variety of applications. For example, these applications may be used to provide longer battery life to the host device, especially when the device is included as part of an Always-On/Always-Connected (AOAC) mode of operation. This longer battery life is enabled by using the power source device as a secondary source of power for the host device or system.

The flow of power through the interface may be achieved by re-purposing the power pin on the port (e.g., USB port) of the host device to receive current, instead of supply current when a connection is detected between the host and a power source device. The data lines may be used to transfer information to the host from the power source device such as battery capacity, remaining capacity, charging/discharging current, supported output voltage(s), recharge cycles, battery health, and/or temperature, all of which may be taken into consideration by the controllers of the host and/or device in supplying power to the host.

In the power source device, the power pin of the connector (e.g., USB connector) may supply according to one application up to 2 A current at a constant 5V of power by default. The host device will be able to obtain all the necessary device attributes through the data lines and even program the internal configuration registers to perform certain actions, such as changing voltage levels, cutting power (for safe removal), or even switching from discharging the device battery to charging it (e.g., when the host is connected to AC or car power).

For backward compatibility, when the power source device is connected to a host device which supports an earlier protocol (e.g., USB) standard (e.g., one which does not support receiving power from a device), driver circuits/software of the device may terminate the supply of power to the host by default, based on some predetermined time limit, based on information received from the host device along the data lines of the interface, or according to other predetermined criteria programmed into the power source device. In the case of a USB application, either or both of the power source device or host device may be USB-OTG compliant.

According to another example, a first laptop may be plugged into an AC charger and a second laptop may connected to the first laptop through an interface. In this scenario, both laptops may be charged using the AC charger of the first laptop, with the first laptop receiving power directly from the charger and the second laptop simultaneously receiving power through the interface. To make this possible, controller 310 in FIGS. 3 and 5 may close switch 344 and the selector may select the input from terminal 331 to allow power from the primary power source to send power to the batteries of both laptops. Switch 343 may be closed at this time.

By charging both laptops at one time (or one laptop and one mobile or other device coupled to the laptop), a potential energy savings may be realized by having only one high-efficiency voltage conversion for both devices.

In addition, a power source device in accordance with any of the embodiments described herein may serve as a universal charger, able to charge any mobile device regardless of brand, manufacturer, or model considerations, as long as the devices have USB or other interface ports and connectors operating as described herein. The charger of one device or host may therefore be used to charge the battery of the other of the device or host, even when the charger is compatible with only one of the host or device. This saves money as earlier model chargers may be retained for use in charging later-model hosts and devices, thereby promoting convenience to the user.

The embodiments described herein may also enable a device with a non-removable battery (e.g., tablets) to have external spare battery packs, use a standard USB or other connector to eliminate the need for a dedicated charging port for some low-powered devices, allow for scalability in terms of being able to plug into multiple power sources at a same time for higher combined power draw, to enable hot-pluggable operation by removing the need for the host and/or device to be powered down while swapping power sources, provide a common standard across a wide range of devices and hosts to promote reuse when the devices or hosts are to be changed, provide backward compatibility with older devices and/or hosts which support USB charging specifications, and provide an ability to change voltage and thereby offer more flexible power management for optimal battery usage and higher efficiency.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of any one embodiment may be combined with features of any other embodiment.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An apparatus comprising:
a controller to set a first circuit path between a finite power source and a connector based on a condition, wherein the condition is to include detection of a connection of an interface between the connector and a port of a host by detecting a reception of a detection signal on a data line of the interface, and the controller is to generate a first control signal to set the first circuit path, in response to the detected detection signal on the data line, the first control signal to change a state of a switch to allow power to pass from the finite power source through the connector when coupled to the interface, the controller including signal lines that match and are to couple to signal lines of the interface, the signal lines of the interface to include a power line, at least two data lines and a ground line, and wherein the finite power source is to output power to the power line of the interface along the first circuit path.

2. The apparatus of claim 1, wherein the connector is a Universal Serial Bus (USB) connector, and the port is a USB port.

3. The apparatus of claim 1, further comprising:
a converter to convert power output from the finite power source from a first level to a second level compatible with the interface.

4. The apparatus of claim 1, wherein the controller is to set a second circuit path to charge the finite power source based on power received from the interface.

5. The apparatus of claim 1, wherein the finite power source is a battery.

6. The apparatus of claim 1, wherein the apparatus is a mobile communication device or an electronic book device.

7. The apparatus of claim 1, wherein the apparatus is a battery pack which excludes circuitry for performing network communications and multimedia functions.

8. The apparatus of claim 1, wherein the apparatus further comprises the finite power source and the connector.

9. The apparatus of claim 1, wherein the controller to provide a detection signal through a data line of the interface to another controller, and the another controller to detect connection of the interface based on the received detection signal.

10. An apparatus comprising:
a host controller to set a first circuit path between a host port and a finite power source based on a condition, wherein the condition is to include detection of a connection of an interface between the port and a connector of a device by detecting a reception of a detection signal on a data line of the interface, and in response to detection of the detection signal on the data line, the host controller is to change a state of a first switch to allow power to pass along the first circuit path to a battery, the host controller including signal lines that match and are to couple to at least data lines of the interface, and wherein power from a power line of the interface is to pass along the first circuit path to charge the battery.

11. The apparatus of claim 10, wherein the port is a Universal Serial Bus (USB) port, and the connector is a USB connector.

12. The apparatus of claim 10, wherein the apparatus is a computer.

13. The apparatus of claim 10, wherein the host controller to provide a detection signal through a data line of the interface to another controller, and the another controller to detect connection of the interface based on the received detection signal.

14. The apparatus of claim 10, wherein the host controller is to control a selector to allow power from a primary power source to charge the battery when the connection between the port and the connector is terminated.

15. The apparatus of claim 14, wherein the host controller is to change the state of the first switch and change a state of a second switch to allow power from the primary power source to flow along a second circuit path, and wherein the second circuit path is to provide power to the device.

16. The apparatus of claim 15, wherein the host controller is to change the state of the first switch and to change the state of the second switch when a signal is received indicating that a battery of the device is to be charged.

17. A method comprising:
 detecting connection of an interface between a device and a host by detecting a detection signal on a data line of the interface; and
 setting a first circuit path in the device based on detection of the detection signal, and the setting of the first circuit path includes generating, in response to the detection signal, a first control signal to set the first circuit path,
 wherein the first control signal is to change a state of a switch to allow power to pass from a finite power source to be output to a power line of the interface through a connector of the device along the first circuit path, the power to pass through the power line of the interface to be used to charge a battery of the host.

18. The method of claim 17, wherein the device is a Universal Serial Bus (USB) device, and the host is a USB host.

19. The method of claim 17, wherein the controller is to set a second circuit path to charge the finite power source based on power received from the interface.

20. The method of claim 17, wherein the finite power source is a battery.

21. The method of claim 17, wherein the device is a mobile communication device.

22. The method of claim 17, wherein the device is an electronic book device.

23. The method of claim 17, wherein the device is battery pack which excludes circuitry for performing network communications and multimedia functions.

24. A method comprising:
 detecting connection of an interface between a host and a device by detecting a detection signal on a data line of the interface; and
 setting a first circuit path in the host based on detection of the detection signal, and the setting of the first circuit path includes generating a first control signal to set the first circuit path in response to the detection signal,
 wherein the first control signal is to change a state of a switch to allow power from the interface to be transferred to a battery along the first circuit path, the power supplied from a finite power source of the device.

25. The method of claim 24, wherein the port is a Universal Serial Bus (USB) port, and the connector is a USB connector.

26. The method of claim 24, wherein the finite power source is a battery.

27. The method of claim 24, wherein the host is a computer, and the device is a mobile communication device.

28. The method of claim 24, wherein the host is a computer, and the device is an electronic book device.

29. The method of claim 24, wherein the host is a computer, and the device is a computer.

\* \* \* \* \*